US012664961B2

(12) United States Patent
Matsukuma

(10) Patent No.: US 12,664,961 B2
(45) Date of Patent: Jun. 23, 2026

(54) BRASS INSTRUMENT

(71) Applicant: YAMAHA CORPORATION, Hamamatsu (JP)

(72) Inventor: Yoshihiko Matsukuma, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 338 days.

(21) Appl. No.: 18/604,914

(22) Filed: Mar. 14, 2024

(65) Prior Publication Data

US 2024/0331665 A1 Oct. 3, 2024

(30) Foreign Application Priority Data

Mar. 30, 2023 (JP) ................................ 2023-056258

(51) Int. Cl.
*G10D 9/01* (2020.01)
*G10D 7/10* (2006.01)

(52) U.S. Cl.
CPC ................ *G10D 9/01* (2020.02); *G10D 7/10* (2013.01)

(58) Field of Classification Search
CPC ............... G10D 9/01; G10D 7/10; G10D 9/00
See application file for complete search history.

(56) References Cited

U.S. PATENT DOCUMENTS 6,255,571 B1 * 7/2001 Takahashi ................ G10D 9/04 84/390

FOREIGN PATENT DOCUMENTS

JP 2013114029 A 6/2013
JP 2017173567 A 9/2017

* cited by examiner

*Primary Examiner* — Kimberly R Lockett
(74) *Attorney, Agent, or Firm* — ROSSI, KIMMS & McDOWELL LLP

(57) ABSTRACT

A brass instrument according to an embodiment comprises a main tube extending from a mouthpiece receiver to a bell, the main tube including a first divided part, a second divided part, and a third divided part sequentially divided on an airway path from the mouthpiece receiver to the bell, a first tuning slide connecting the first divided part and the second divided part, and a second tuning slide connecting the second divided part and the third divided part. The first tuning slide and the second tuning slide adjust a total length of the main tube.

10 Claims, 5 Drawing Sheets

BRASS INSTRUMENT

CROSS-REFERENCE TO RELATED APPLICATIONS

This application claims the benefit of priority to Japanese Patent Application No. 2023-056258, filed on Mar. 30, 2023, the entire contents of which are incorporated herein by reference.

FIELD

The present disclosure relates to a brass instrument.

BACKGROUND

A brass instrument includes a tuning slide, so-called a valve slide, for adjusting a pitch of a sound of an instrument. A total length of the instrument can be adjusted by adjusting a length of such a tuning slide and the pitch of the instrument can be adjusted. Japanese laid-open patent publication No. 2013-114029 and Japanese laid-open patent publication No. 2017-173567 describe trumpets having the valve slide.

SUMMARY

According to an embodiment, a brass instrument comprising a main tube extending from a mouthpiece receiver to a bell, the main tube including a first divided part, a second divided part, and a third divided part sequentially divided on an airway path from the mouthpiece receiver to the bell, a first tuning slide connecting the first divided part and the second divided part, and a second tuning slide connecting the second divided part and the third divided part, wherein the first tuning slide and the second tuning slide adjust a total length of the main tube is provided.

DESCRIPTION OF EMBODIMENTS

Figure 1:
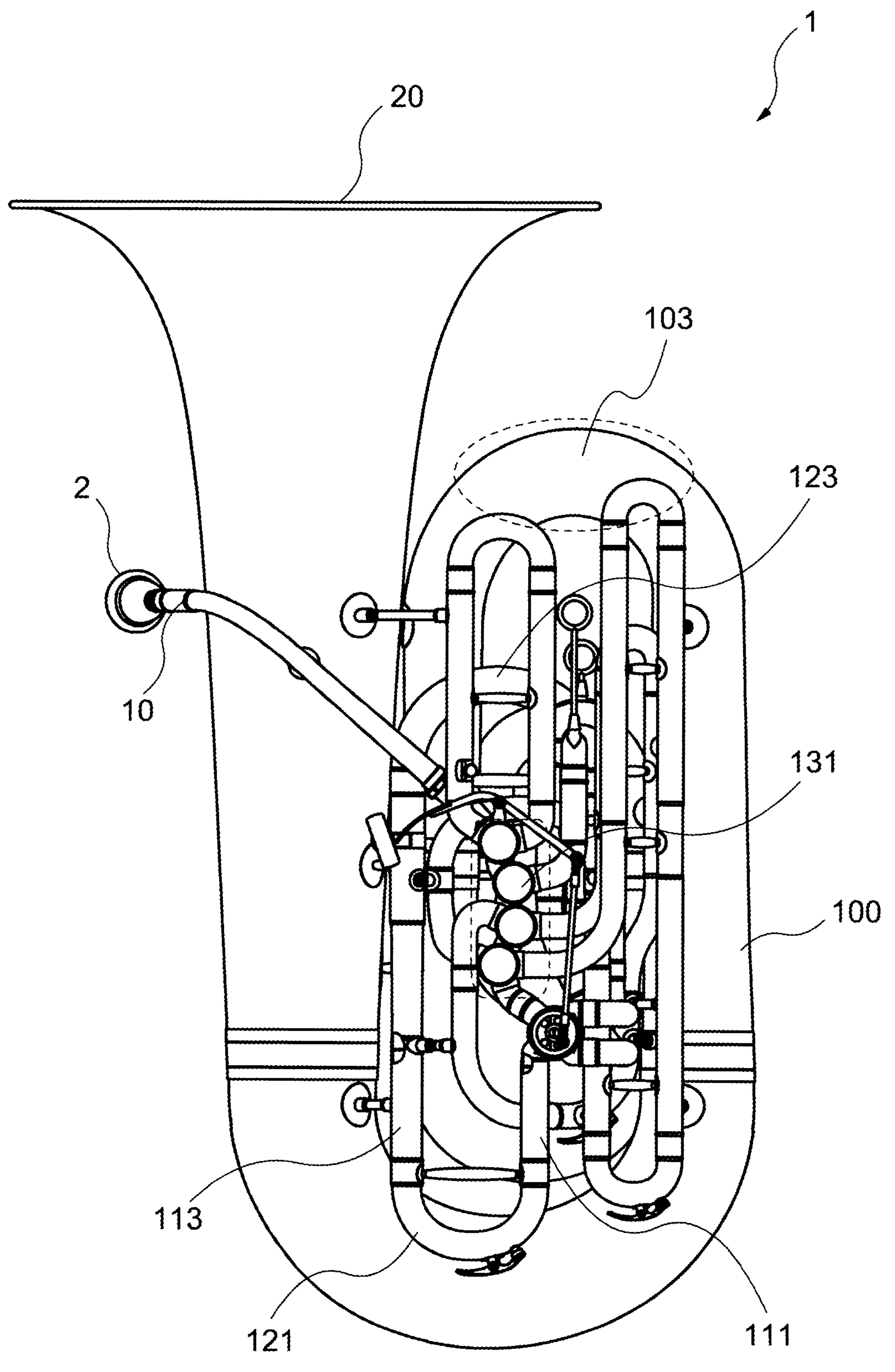
FIG. 1 is a diagram showing an external appearance of a tuba according to an embodiment.

A player of a brass instrument can finely adjust a pitch of a sound coming out of the instrument by adjusting a length of a tuning slide (valve slide). In addition, in the case of setting the pitch for each region employed in an orchestra and in the case of setting the pitch according to a performance environment (for example, a severe cold district or high-temperature district), the pitch can be finely adjusted by adjusting the length of the tuning slide.

However, in the case where the number of tuning slides arranged in a brass instrument is one, there is a limit to the pitch that can be adjusted. In order to increase the pitch adjustment amount by one tuning slide, it is conceivable to increase the length of the tuning slide and increase the variable amount of the total length of the instrument by one tuning slide. However, if a length of one tuning slide having a straight tube part is increased in an instrument constructed in a tapered shape, there is a problem that a balance of a pitch, a scale, etc. of sounds emitted from the instrument is lost.

In addition, in the case where the number of tuning slides arranged in the brass instrument is one, depending on a position of the tuning slide in the brass instrument, the player of the instrument cannot adjust the position of the tuning slide during the performance, and there is a problem that the pitch cannot be finely adjusted during the performance.

According to the present disclosure, the pitch adjustment amount can be increased while maintaining the sound balance.

Hereinafter, an embodiment of the present disclosure will be described in detail with reference to the drawings. The following embodiment is an example, and the present disclosure should not be construed as being limited to this embodiment. The same or similar parts in the drawings referred to in the present embodiment are denoted by the same reference signs or similar reference signs (only denoted by A, B, and the like after the numerals), and repetitive description thereof may be omitted. The drawings may be illustrated schematically, with dimensional ratios different from actual ratios, or with part of a composition omitted from the drawings for clarity of explanation in the drawings.

A brass instrument according to an embodiment includes a plurality of tuning slides each of which is capable of adjusting the total length of a main tube. Adjusting the total length of the main tube by the plurality of tuning slides makes it possible to increase the pitch adjustment amount while maintaining the balance of the sound. In addition, installing at least one tuning slide at a position that can be operated by the player during the performance of the instrument makes it possible to fine-adjust the pitch by the tuning slide even during the performance of the instrument.

Hereinafter, a brass instrument according to an embodiment will be described with reference to the drawings. The case where the brass instrument is a tuba will be described as an example in the embodiment described below. In addition, the brass instrument according to the present disclosure is not limited to a tuba.

[Composition of Instrument]

Figure 2:
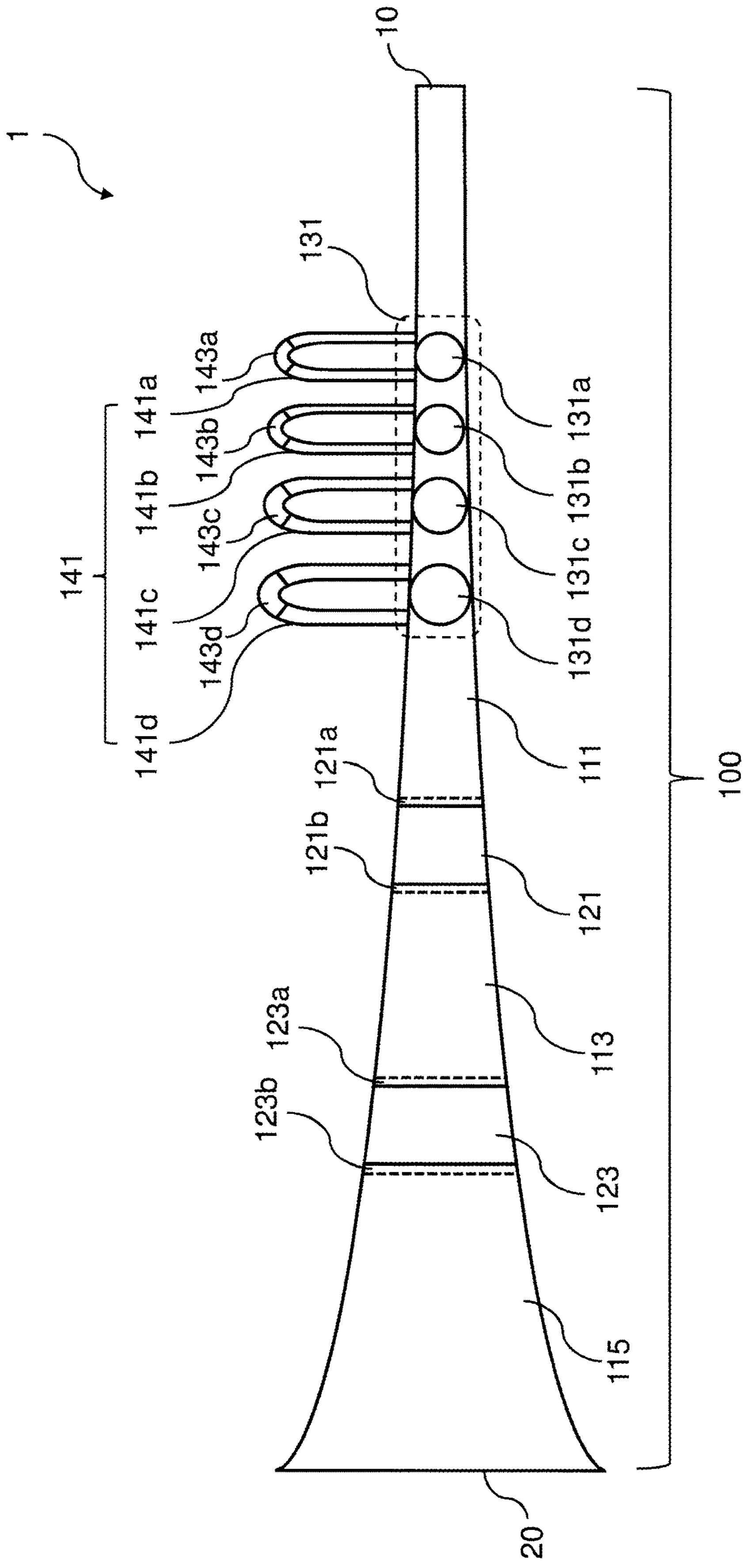
FIG. 2 is a schematic diagram for explaining a composition of a main tube of a tuba according to an embodiment.

FIG. 1 is a diagram showing an external appearance of a tuba 1 according to the present embodiment as viewed from a predetermined direction. FIG. 2 is a schematic view for explaining a composition of a main tube 100 of the tuba 1. The tuba 1 is a piston type and front action type in the present embodiment. However, the tuba 1 according to the present embodiment is not limited to the piston type, and may be a rotary type. In addition, the tuba 1 according to the present embodiment may be a piston type and top action type.

The composition of the tuba 1 will be described with reference to FIG. 1 and FIG. 2. The tuba 1 includes the main tube 100 and a plurality of valve tubes 141 (141*a* to 141*d*) connectable to the main tube 100. The main tube 100 includes a mouthpiece receiver 10 and a bell 20 which emits a sound, and constitutes an air column of the tuba 1. The main tube 100 extends from the mouthpiece receiver 10 to the bell 20. The main tube 100 has a plurality of bends and is bent at the bends, as shown in FIG. 1. FIG. 2 shows the main tube 100 with the plurality of bends extended. The main tube 100 has a generally tapered shape from the mouthpiece receiver to the bell 20 which emits a sound, as shown in FIG. 2. In addition, the main tube 100 may partially include a straight tube having a constant outside diameter. A mouthpiece 2 is inserted into the mouthpiece receiver 10 when playing the tuba 1.

Each of the plurality of valve tubes 141 (the first valve tube 141*a*, the second valve tube 141*b*, the third valve tube 141*c*, and the fourth valve tube 141*d*) can be connected to the main tube 100 via corresponding piston valve 131 (a first piston valve 131*a*, a second piston valve 131*b*, the third piston valve 131*c*, or the fourth piston valve 131*d*) among the plurality of piston valves 131. Each of the plurality of valve tubes 141 (141*a* to 141*d*) is connected to the main tube 100 via corresponding piston valve 131 (131*a* to 131*d*) and then constitutes an air column of the tuba 1 together with the main tube 100. Hereinafter, in the case where the first valve tube 141*a* to the fourth valve tube 141*d* are not distinguished from each other, they are simply referred to as the plurality of valve tubes 141 or the valve tube 141. Similarly, in the case where the first piston valve 131*a* to the fourth piston valve 131*d* are not distinguished from each other, they are simply referred to as the plurality of piston valves 131 or the piston valve 131. When a player of the tuba 1 operates the piston valve 131 so that the piston valve 131 is depressed, the valve tube 141 corresponding to the depressed piston valve 131 is connected to the main tube 100.

Each of the plurality of valve tubes 141 includes valve slide 143 (a first valve slide 143*a*, a second valve slide 143*b*, a third valve slide 143*c* or a fourth valve slide 143*d*). The valve slide 143 adjusts a total length of the corresponding valve tube 141 by inserting or pulling out the valve slide 143, that is, sliding in a predetermined direction.

The main tube 100 has a plurality of divided parts. The main tube 100 includes a first divided part 111, a second divided part 113, and a third divided part 115 sequentially divided on an airway path from the mouthpiece receiver 10 to the bell 20 in the present embodiment. Further, the main tube 100 includes a first tuning slide 121 that connects the first divided part 111 and the second divided part 113, and a second tuning slide 123 that connects the second divided part 113 and a third divided part 115. The first divided part 111, the second divided part 113, the third divided part 115, the first tuning slide 121, and the second tuning slide 123 are connected to each other to constitute a series of the main tube 100. In addition, although the main tube 100 includes three divided parts of the first divided part 111, the second divided part 113, and the third divided part 115, the number of divided parts included in the main tube 100 may be three or more in the present embodiment.

The first divided part 111 has the mouthpiece receiver 10. A side on which the mouthpiece receiver 10 is arranged is also referred to as an upstream side of the main tube 100, and a side on which the bell 20 is arranged is also referred to as a downstream side of the main tube 100, in the present embodiment. That is, the first divided part 111 is located on the upstream side of the main tube 100. The plurality of valve tubes 141 and the plurality of piston valves 131 capable of connecting the main tube 100 and the plurality of valve tubes 141 may be arranged in the first divided part 111.

The second divided part 113 is connected to the first divided part 111 via the first tuning slide 121. The second divided part 113 is located on the downstream side of the first divided part 111.

The first tuning slide 121 is a so-called slide. The first tuning slide 121 has a first slide part 121*a* and a second slide part 121*b* at both ends. At least part of the first slide part 121*a* is inserted into a downstream-side end portion of the first divided part 111 to connect the first tuning slide 121 and the first divided part 111. At least part of the second slide part 121*b* is inserted into an upstream-side end portion of the second divided part 113 to connect the first tuning slide 121 and the second divided part 113. The first tuning slide 121 is separable from the first divided part 111 and the second divided part 113.

A connection length between the first slide part 121*a* and the first divided part 111 and a connection length between the second slide part 121*b* and the second divided part 113 varies by simultaneously sliding the first slide part 121*a* and the second slide part 121*b* with respect to the first divided part 111 and the second divided part 113. The connection length between the first slide part 121*a* and the first divided part 111 is a length along an extension direction of the main tube 100 in an overlapping portion between the first slide part 121*a* and the downstream-side end portion of the first divided part 111 in a state where the first slide part 121*a* is inserted into the downstream-side end portion of the first divided part 111. Similarly, the connection length between the second slide part 121*b* and the second divided part 113 is a length along the extension direction of the main tube 100 in an overlapping portion between the second slide part 121*b* and the upstream-side end portion of the second divided part 113 in a state where the second slide part 121*b* is inserted into the upstream-side end portion of the second divided part 113.

The total length of the main tube 100 of the tuba 1 can be adjusted by adjusting the connection length between the first slide part 121*a* and the first divided part 111 and the connection length between the second slide part 121*b* and the second divided part 113. In other words, the total length of the main tube 100 varies depending on the connection length between the first slide part 121*a* and the first divided part 111 and the connection length between the second slide part 121*b* and the second divided part 113. Specifically, the longer the connection length between the first slide part 121*a* and the first divided part 111 and the connection length between the second slide part 121*b* and the second divided part 113, the shorter the total length of the main tube 100. As the total length of the main tube 100 varies, an airway path length of the main tube 100 also varies. Thus, as the total length of the main tube 100 shortens, the airway path length of the main tube 100 also shortens and as the total length of the main tube 100 increases, the airway path length of the main tube 100 also increases.

The third divided part 115 is connected to the second divided part 113 via the second tuning slide 123. The third divided part 115 is located on the downstream side of the second divided part 113. The bell 20 is arranged at the downstream-side end portion of the third divided part 115.

The second tuning slide 123 is a so-called slide. The second tuning slide 123 has a third slide part 123*a* and a fourth slide part 123*b* at both ends. At least part of the third slide part 123*a* is inserted into a downstream-side end portion of the second divided part 113 to connect the second tuning slide 123 and the second divided part 113. At least part of the fourth slide part 123*b* is inserted into an upstream-side end portion of the third divided part 115 to connect the second tuning slide 123 and the third divided part 115. The second tuning slide 123 is separable from the second divided part 113 and the third divided part 115.

A connection length between the third slide part 123*a* and the second divided part 113 and a connection length between the fourth slide part 123*b* and the third divided part 115 varies by simultaneously sliding the third slide part 123*a* and the fourth slide part 123*b* with respect to the second divided part 113 and the third divided part 115. The connection length between the third slide part 123*a* and the second divided part 113 is a length along the extension direction of the main tube 100 in an overlapping portion between the third slide part 123*a* and the downstream-side end portion of the second divided part 113 in a state where the third slide part 123*a* is inserted into the downstream-side end portion of the second divided part 113. Similarly, the connection length between the fourth slide part 123*b* and the third divided part 115 is the length along the extension direction of the main tube 100 in an overlapping portion between the fourth slide part 123*b* and the upstream-side end portion of the third divided part 115 in a state where the fourth slide part 123*b* is inserted into the upstream-side end portion of the third divided part 115.

The total length of the main tube 100 of the tuba 1 can be adjusted by adjusting the connection length between the third slide part 123*a* and the second divided part 113 and the connection length between the fourth slide part 123*b* and the third divided part 115. In other words, the total length of the main tube 100 varies depending on the connection length between the third slide part 123*a* and the second divided part 113 and the connection length between the fourth slide part 123*b* and the third divided part 115. Specifically, the longer the connection length between the third slide part 123*a* and the second divided part 113 and the connection length between the fourth slide part 123*b* and the third divided part 115, the shorter the total length of the main tube 100. As described above, as the total length of the main tube 100 varies, an airway path length of the main tube 100 also varies.

[Composition of First Tuning Slide]

Figure 3:
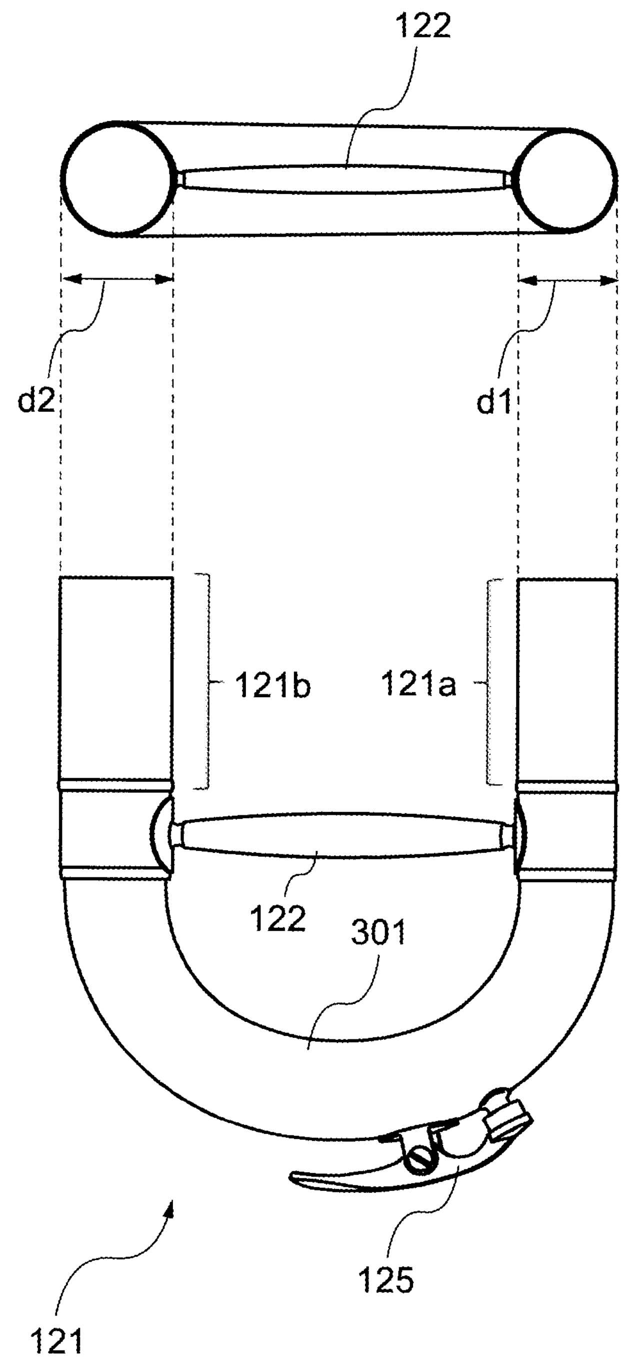
FIG. 3 is a diagram showing a composition of a first tuning slide according to an embodiment.

The first tuning slide 121 is located on a lower side of the tuba 1 in FIG. 1, that is, on a side opposite to the side where the mouthpiece receiver 10 and the bell 20 are located, as shown in FIG. 1. FIG. 3 is a diagram showing a composition of the first tuning slide 121.

The first tuning slide 121 has a bend 301 and the first slide part 121*a* and the second slide part 121*b* extending from the bend 301. The first slide part 121*a* extends from one end of the bend 301. The second slide part 121*b* extends from the other end of the bend 301 in the same direction as the first slide part 121*a*. The first tuning slide 121 has a U-shape.

The main tube 100 has a tapered shape in which the diameter of the tube gradually increases from the mouthpiece receiver to the bell 20, as described above. Therefore, an outside diameter d1 of the first slide part 121*a* is smaller than an outside diameter d2 of the second slide part 121*b* (d1<d2). For example, the outside diameter d1 of the first slide part 121*a* is about 21 mm, and the outside diameter d2 of the second slide part 121*b* is about 24 mm. In addition, the shapes of the first slide part 121*a* and the second slide part 121*b* are cylindrical, and their outside diameters are constant. In other words, the first slide part 121*a* and the second slide part 121*b* are straight tubes.

The player can simultaneously adjust the connection length between the first slide part 121*a* and the first divided part 111 and the connection length between the second slide part 121*b* and the second divided part 113 by sliding the first tuning slide 121 along a connection direction between the first tuning slide 121 and the first divided part 111 and the second divided part 113 (vertical direction in FIG. 1). For example, in the case where the length of the first slide part 121*a* and the length of the second slide part 121*b* along the connection direction are each approximately 50 mm, the maximum variable amount of the total length of the main tube 100 by the first tuning slide 121 is about 100 mm.

The first tuning slide 121 may include a handle 122. The player may grasp the handle 122 to slide the first tuning slide 121 with respect to the first divided part 111 and the second divided part 113. In addition, the handle 122 may be omitted. Furthermore, the first tuning slide 121 may have a water key 125 at the bend 301.

[Composition of Second Tuning Slide]

Figure 4:
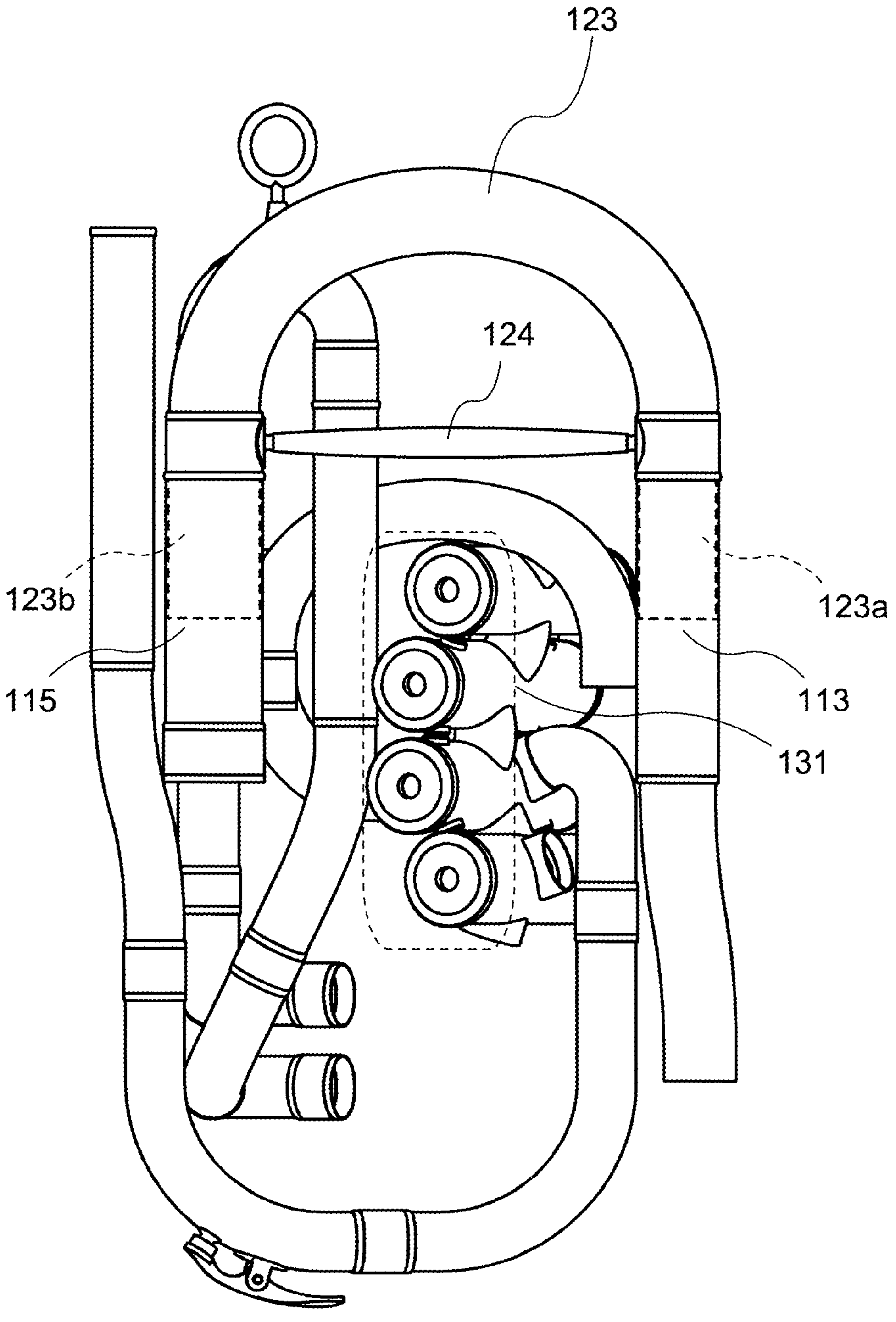
FIG. 4 shows a second tuning slide in the tuba shown in FIG. 1.
Figure 5:
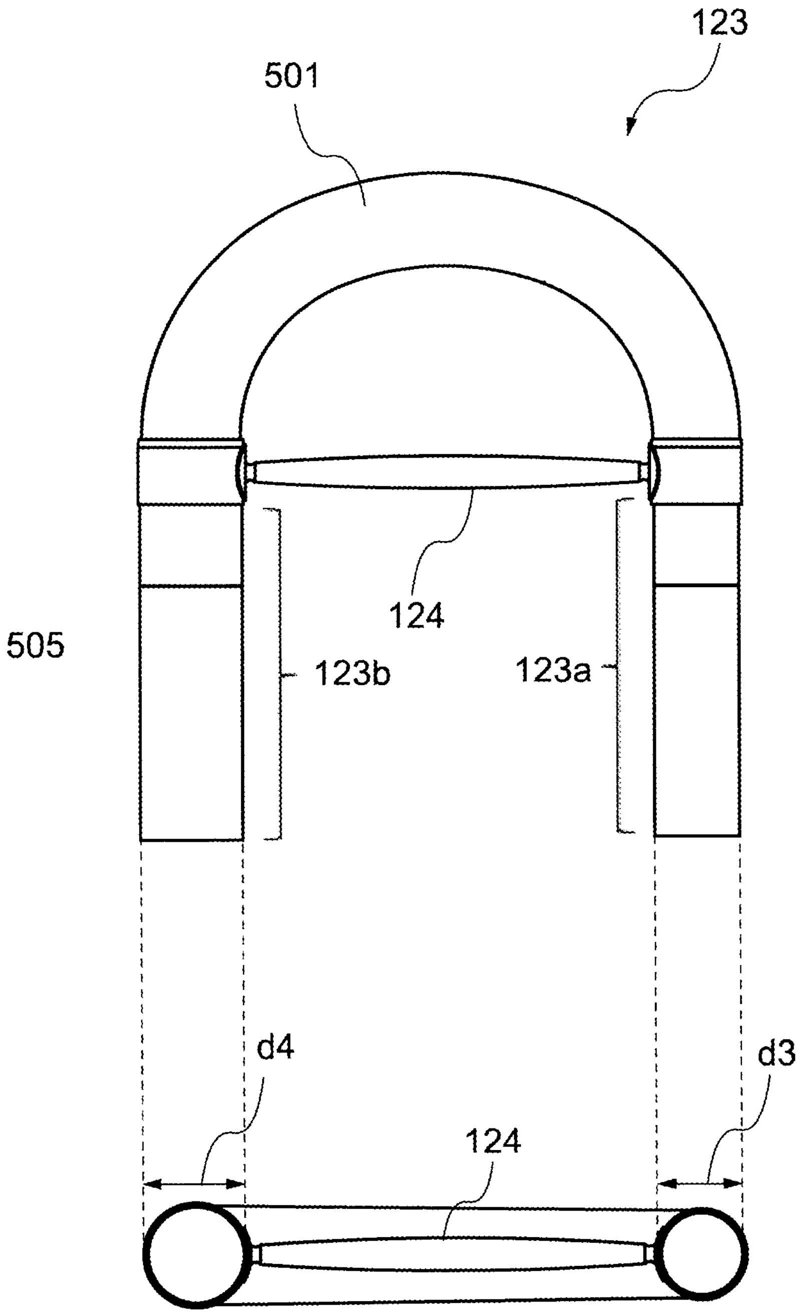
FIG. 5 is a diagram showing a composition of a second tuning slide according to an embodiment.

The second tuning slide 123 is located on the upper side of the tuba 1, that is, on the same side as the side where the mouthpiece receiver 10 and the bell 20 are located, as shown in FIG. 1. FIG. 4 shows the second tuning slide 123 when the tuba 1 shown in FIG. 1 is viewed from the opposite side of the predetermined direction. FIG. 4 shows a state in which the third slide part 123*a* and the fourth slide part 123*b* of the second tuning slide 123 are completely inserted into the downstream-side end portion of the second divided part 113 and the upstream-side end portion of the third divided part 115. FIG. 5 is a diagram showing an external appearance of the second tuning slide 123.

The second tuning slide 123 has a bend 501 and the third slide part 123*a* and the fourth slide part 123*b* extending from the bend 501. The third slide part 123*a* extends from one end of the bend 501. The fourth slide part 123*b* extends from the other end of the bend 501 in the same direction as the third slide part 123*a*. The second tuning slide 123 has a U-shape.

The main tube 100 has a tapered shape in which the diameter of the tube gradually increases from the mouthpiece receiver to the bell 20, as described above. Therefore, an outside diameter d3 of the third slide part 123*a* is smaller than an outside diameter d4 of the fourth slide part 123*b* (d3<d4). For example, the outside diameter d3 of the third slide part 123*a* is about 26 mm, and the outside diameter d4 of the fourth slide part 123*b* is about 32 mm. In addition, the outside diameter d3 of the third slide part 123*a* is larger than the outside diameter d2 of the second slide part 121*b* of the first tuning slide 121 (d2<d3). In other words, the outside diameter of the second tuning slide 123 is larger than the outside diameter of the first tuning slide 121. In addition, the shapes of the third slide part 123*a* and the fourth slide part 123*b* are cylindrical, and their outside diameters are constant. In other words, the third slide part 123*a* and the fourth slide part 123*b* are straight tubes. In addition, the outside diameter d4 of the fourth slide part 123*b* is 30 mm or more and 50 mm or less.

The player can simultaneously adjust the connection length between the third slide part 123*a* and the second divided part 113 and the connection length between the fourth slide part 123*b* and the third divided part 115 by sliding the second tuning slide 123 along a connection direction between the second tuning slide 123 and the second divided part 113 and the third divided part 115 (vertical direction in FIG. 1, FIG. 4, and FIG. 5). For example, in the case where the length of the third slide part 123*a* and the length of the fourth slide part 123*b* along the connection direction are each approximately 70 mm, the maximum variable amount of the total length of the main tube 100 by the second tuning slide 123 is about 140 mm.

Considering the operability during the performance, clearances between the outside diameter of the second tuning slide 123, that is, the outside diameter of the third slide part 123*a* and the outside diameter of the fourth slide part 123*b* and the second divided part 113 and the third divided part 115 are larger than clearances between the outside diameter of the first tuning slide 121, that is, the outside diameter of the first slide part 121*a* and the outside diameter of the second slide part 121*b* and the first divided part 111 and the second divided part 113. In other words, connection portions between the second tuning slide 123 and the second divided part 113 and the third divided part 115 are looser than connection portions between the first tuning slide 121 and the first divided part 111 and the second divided part 113. This causes the second tuning slide 123 to easily slide with respect to the second divided part 113 and the third divided part 115, and the operability by the player is improved even during the performance. For example, the clearances between the outside diameter of the third slide part 123*a* and the outside diameter of the fourth slide part 123*b* and the second divided part 113 and the third divided part 115 are about 30 μm larger than the clearances between the outside diameter of the first slide part 121*a* and the outside diameter of the second slide part 121*b* and the first divided part 111 and the second divided part 113.

In addition, the length along the connection direction of the third slide part 123*a* and the fourth slide part 123*b* is preferably three times or more of the outside diameter of the second tuning slide 123, that is, the outside diameter of the third slide part 123*a* and the outside diameter of the fourth slide part 123*b*. As a result, the second tuning slide 123 can be smoothly slid with respect to the second divided part 113 and the third divided part 115.

The second tuning slide 123 may include a handle 124. The player can grasp the handle 124 to slide the second tuning slide 123 with respect to the second divided part 113 and the third divided part 115. In addition, the handle 124 may be omitted.

The position of the second tuning slide 123 in the tuba 1 is structurally closer to the mouthpiece receiver 10 than the position of the first tuning slide 121, as shown in FIG. 1. Therefore, it is easy for the player to slide the second tuning slide 123 with respect to the second divided part 113 and the third divided part 115 during the performance of the tuba 1, and the operability by the player is improved.

The main tube 100 is bent a plurality of times from the mouthpiece receiver to the bell 20 and has a plurality of bends, as shown in FIG. 1. A predetermined bend 103 among the plurality of bends of the main tube 100 is positioned on the extension of a slide direction of the second tuning slide 123 (vertical direction in FIG. 1). In other words, the second tuning slide 123 is located inside the bend 103. A space where the second tuning slide 123 can slide is arranged between the second tuning slide 123 and the bend 103. The shortest distance between the second tuning slide 123 and the bend 103 in the slide direction of the second tuning slide 123 is larger than the length of the third slide part 123*a* and the fourth slide part 123*b* in the connection direction (vertical direction in FIG. 1). As a result, the second tuning slide 123 can be separated from the second divided part 113 and the third divided part 115 without contacting the bend 103. The bend 103 may be a bend closest to the player during the performance of the tuba 1 among the plurality of bends in the main tube 100.

The main tube 100 of the tuba 1 according to the present embodiment includes the first tuning slide 121 and the second tuning slide 123 as described above. In other words, the main tube 100 includes two slides. As a result, the pitch adjustment amount is increased in the tuba 1 according to the present embodiment as compared with the conventional tuba having one slide. In addition, since the pitch is adjusted by the first tuning slide 121 and the second tuning slide 123, the tapered shape of the main tube 100 is maintained, and as a result, the pitch adjustment amount can be increased while maintaining the balance of sounds such as the pitch and the scale.

Further, the position of the second tuning slide 123 is structurally closer to the mouthpiece receiver 10 than the position of the first tuning slide 121. Therefore, it is easy for the player who is playing the tuba 1 to operate the second tuning slide 123, and the pitch during the performance can be finely adjusted.

[Modifications]

Although an embodiment of the present disclosure has been described above, the present disclosure can be implemented in various aspects as follows.

(1) Although the tuba is described as a brass instrument in the above-described embodiment, the brass instrument is not limited to a tuba, and may be a bulb type brass instrument such as a euphonium, a baryton, or a horn having a long tube length.

(2) The installation positions of the plurality of valve tubes 141 and the plurality of piston valves 131 are not limited to the first divided part 111. For example, the plurality of valve tubes 141 and the plurality of piston valves 131 may be arranged in the second divided part 115.

What is claimed is:

1. A brass instrument comprising:

a main tube extending from a mouthpiece receiver to a bell, the main tube including:

a first divided part, a second divided part, and a third divided part sequentially divided on an airway path from the mouthpiece receiver to the bell;

a first tuning slide connecting the first divided part and the second divided part; and a second tuning slide connecting the second divided part and the third divided part, wherein the first tuning slide and the second tuning slide adjust a total length of the main tube.

2. The brass instrument according to claim 1 further comprising: a plurality of valve tubes connected to the first divided part.

3. The brass instrument according to claim 1, wherein the first tuning slide includes a first slide part connected to the first divided part and a second slide part connected to the second divided part;

the second tuning slide includes a third slide part connected to the second divided part and a fourth slide part connected to the third divided part; and the total length of the main tube varies depending on a connection length between the first slide part and the first divided part, a connection length between the second slide part and the second divided part, and a connection length between the third slide part and the second divided part, and a connection length between the fourth slide part and the third divided part.

4. The brass instrument according to claim 1, wherein an outside diameter of the second tuning slide is larger than an outside diameter of the first tuning slide.

5. The brass instrument according to claim 4, wherein an outside diameter of the fourth slide part is 30 mm or more and 50 mm or less.

6. The brass instrument according to claim 1, wherein a maximum variation in the overall length of the main tube due to the second tuning slide is approximately 140 mm.

7. The brass instrument according to claim 1, wherein the second tuning slide is structurally closer to the mouthpiece receiver than the first tuning slide.

8. The brass instrument according to claim 1, wherein:

the main tube includes a plurality of bends, and a predetermined bend among the plurality of bends is positioned on an extension of a slide direction of the second tuning slide.

9. The brass instrument according to claim 1, further comprising a water key arranged in the first tuning slide.

10. The brass instrument according to claim 1, wherein the brass instrument is a tuba.

* * * * *